(12) United States Patent
Pullins, II et al.

(10) Patent No.: US 11,274,031 B2
(45) Date of Patent: *Mar. 15, 2022

(54) INOCULANT DIRECT INJECTION SYSTEM

(71) Applicant: Verdesian Life Sciences U.S., LLC, Cary, NC (US)

(72) Inventors: James C. Pullins, II, Lancaster, OH (US); Wendy S. Laffoon, Goodland, IN (US); David W. Laffoon, Goodland, IN (US); Kurt P. Seevers, Elkhorn, NE (US); Charles Broughton, Mazomanie, WI (US); Thomas J. Ashachik, Raleigh, NC (US)

(73) Assignee: Verdesian Life Sciences U.S., LLC, Cary, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/925,887

(22) Filed: Jul. 10, 2020

(65) Prior Publication Data

US 2020/0399114 A1 Dec. 24, 2020

Related U.S. Application Data

(63) Continuation-in-part of application No. 16/081,742, filed as application No. PCT/US2017/020755 on Mar. 3, 2017, now Pat. No. 11,078,067.

(Continued)

(51) Int. Cl.
*B67D 7/74* (2010.01)
*B67D 7/02* (2010.01)
(Continued)

(52) U.S. Cl.
CPC ............ *B67D 7/74* (2013.01); *B67D 7/0216* (2013.01); *B67D 7/0294* (2013.01); *B67D 7/70* (2013.01); *A01C 1/06* (2013.01)

(58) Field of Classification Search
CPC .......... B67D 7/0288; B67D 7/02; B67D 7/74; B67D 7/78; B67D 7/0216; B67D 7/0294; B67D 7/70; A01C 1/06
(Continued)

(56) References Cited

U.S. PATENT DOCUMENTS 2,198,524 A 4/1940 Berwick
4,344,469 A * 8/1982 Brown ................ A01M 21/043
137/240

(Continued)

FOREIGN PATENT DOCUMENTS

EP 0358317 B1 2/1994
WO 2016089750 A1 9/2016

OTHER PUBLICATIONS

International Search Report and Written Opinion for PCT/IB2018/054025, dated Nov. 5, 2018.

(Continued)

*Primary Examiner* — Jessica Cahill
(74) *Attorney, Agent, or Firm* — Katten Muchin Rosenman LLP

(57) ABSTRACT

A liquid direct injection assembly includes a direct injection supply kit to mix liquid components into a mixture and deliver the mixture to a treatment device. The supply kit includes one or more liquid component containers that each include an elongated flexible bladder and a discharge nozzle to discharge a corresponding liquid component from the bladder. The supply kit also includes one or more metering bodies each defining a metering orifice to control a flow rate of the corresponding liquid component from the bladder. The liquid direct injection assembly also includes a container tray configured to removably support a liquid component container.

13 Claims, 11 Drawing Sheets

Related U.S. Application Data

(60) Provisional application No. 62/447,789, filed on Jan. 18, 2017, provisional application No. 62/303,054, filed on Mar. 3, 2016.

(51) Int. Cl.
*B67D 7/70* (2010.01)
*A01C 1/06* (2006.01)

(58) Field of Classification Search
USPC .............................. 137/602, 896, 606, 551
See application file for complete search history.

(56) References Cited

U.S. PATENT DOCUMENTS

| | | | | |
|---|---|---|---|---|
| 4,913,316 A | * | 4/1990 | Richter | B67D 1/0078 222/1 |
| 5,163,587 A | | 11/1992 | Apps et al. | |
| 5,526,956 A | * | 6/1996 | Osgar | B65D 85/84 222/105 |
| 6,056,512 A | * | 5/2000 | Amberg | B67D 7/0216 417/205 |
| 8,707,950 B1 | | 4/2014 | Rubin | |
| 2006/0084573 A1 | | 4/2006 | Grech | |
| 2007/0105719 A1 | | 5/2007 | Unkefer | |
| 2010/0209410 A1 | | 8/2010 | Schoefl | |
| 2012/0097763 A1 | | 4/2012 | Orubor | |
| 2014/0083340 A1 | | 3/2014 | Dull et al. | |
| 2015/0282479 A1 | | 10/2015 | Basel et al. | |
| 2016/0037768 A1 | | 2/2016 | Ohara et al. | |
| 2016/0249616 A1 | | 9/2016 | Bristow | |

OTHER PUBLICATIONS

International Preliminary Report on Patentability for PCT/IB2018/054025, dated Dec. 10, 2019.
Official Decision of Grant dated Jun. 19, 2020 for Russian Application No. 2018134594.

* cited by examiner

INOCULANT DIRECT INJECTION SYSTEM

CROSS REFERENCE TO RELATED APPLICATIONS

This application is a continuation-in-part of U.S. application Ser. No. 16/081,742, filed Aug. 31, 2018, which is a National Stage of International Application No. PCT/US2017/020755, filed Mar. 3, 2017, which claims the benefit of U.S. Provisional Application Ser. No. 62/303,054, filed Mar. 3, 2016 and U.S. Provisional Application Ser. No. 62/447,789, filed Jan. 18, 2017, each of which is hereby incorporated in its entirety by reference herein.

BACKGROUND

1. Field

The present invention relates generally to multi-part liquid mixture delivery systems. More specifically, embodiments of the present invention concern a direct injection system operable to combine liquid components into a multi-part liquid mixture and dispense the mixture to a treatment device, such as a seed treater.

2. Discussion of Prior Art

Seed treatment systems have long been used to apply liquid treatments to a batch of seed in a seed treater vessel. For instance, a rhizobial bacteria inoculant can be supplied in a single bag which is then applied to the seed through a seed treater vessel. It is also common for additional bags of extender or other liquid components to be supplied along with the inoculant that need to be mixed prior to being applied to the seed. In both cases, the inoculant and additional liquid bag components are pre-measured and supplied in separate bags of a prepackaged supply. The prepackaged supply of components provides component volumes associated with the treatment of a set amount of seed. The components are combined to provide a multi-part mixture with a predetermined volume ratio of components. The inoculant and growth extender components are manually poured from the bags into a mix tank where the liquid components are combined to form the multi-part mixture (see FIG. 1).

Conventional seed treatment systems for applying inoculant have various deficiencies. For instance, the components must be kept in a sterile environment until use. Thus, the multi-part mixture of inoculant and growth extender is applied to seed within about one day, otherwise the mixture will become ineffective. When each component bag is opened, the liquid component in the bag must also be used within about one day. Consequently, it is common for parts of the liquid components to be unused, particularly when treating a seed batch that is smaller than the set amount of seed associated with the prepackaged component supply.

Another problem is that the entire contents of bags are emptied in their entireties because they must be mixed precisely to specific proportions, and the bags are provided to ensure the proper mixture ratio. Because the mixture must be used quickly, as noted, the user typically requires a given amount of seed (corresponding to the amount of the mixture generated from the entire contents of the bags) to be treated. That is, prior art treatment systems do not permit on-demand treatment of variable seed amounts, without risking the degradation of the treatment material.

SUMMARY

The following brief summary is provided to indicate the nature of the subject matter disclosed herein. While certain aspects of the present invention are described below, the summary is not intended to limit the scope of the present invention.

Embodiments of the present invention provide a direct injection system that does not suffer from the problems and limitations of the prior art seed treatment systems set forth above.

A first aspect of the present invention concerns a direct injection supply kit to mix liquid components into a mixture and deliver the mixture to a treatment device. The direct injection supply kit broadly includes one or more liquid component containers and one or more metering bodies fluidly communicating with respective component containers. The containers each present an interior space configured to receive a corresponding one of the liquid components of the mixture. Each of the containers includes an elongated flexible bladder, which generally defines the interior space, and a discharge nozzle, which fluidly communicates with the interior space to discharge a flow of the corresponding liquid component from the bladder. Each of the metering bodies defines a metering orifice to control a flow rate of the corresponding liquid component from the bladder, with at least a pair of the metering bodies presenting dissimilar metering orifices so as to provide distinct flow rates of the corresponding liquid components. The number of liquid component containers in the described direct injection supply kit can vary. For example, in some embodiments, the direct injection supply kit may contain a single liquid component container. In other embodiments, the direct injection supply kit contain at least two or more liquid component containers.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the present invention will be apparent from the following detailed description of the embodiments and the accompanying drawing figures.

BRIEF DESCRIPTION OF THE DRAWING FIGURES

Preferred embodiments of the invention are described in detail below with reference to the attached drawing figures, wherein.

Figure 13:
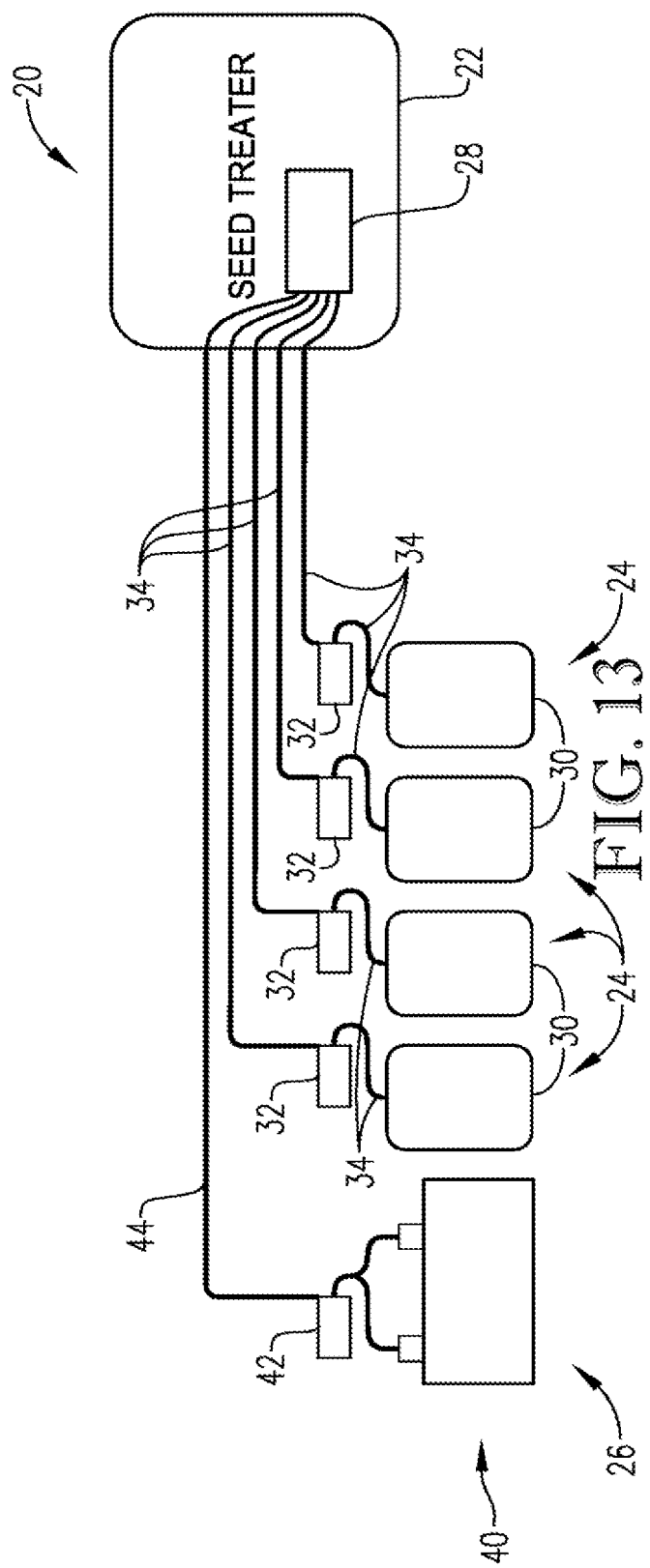
FIG. 13 is a fragmentary schematic view of a seed treatment system constructed in accordance with a preferred embodiment of the present invention, showing a direct injection assembly of the system.
Figure 14:
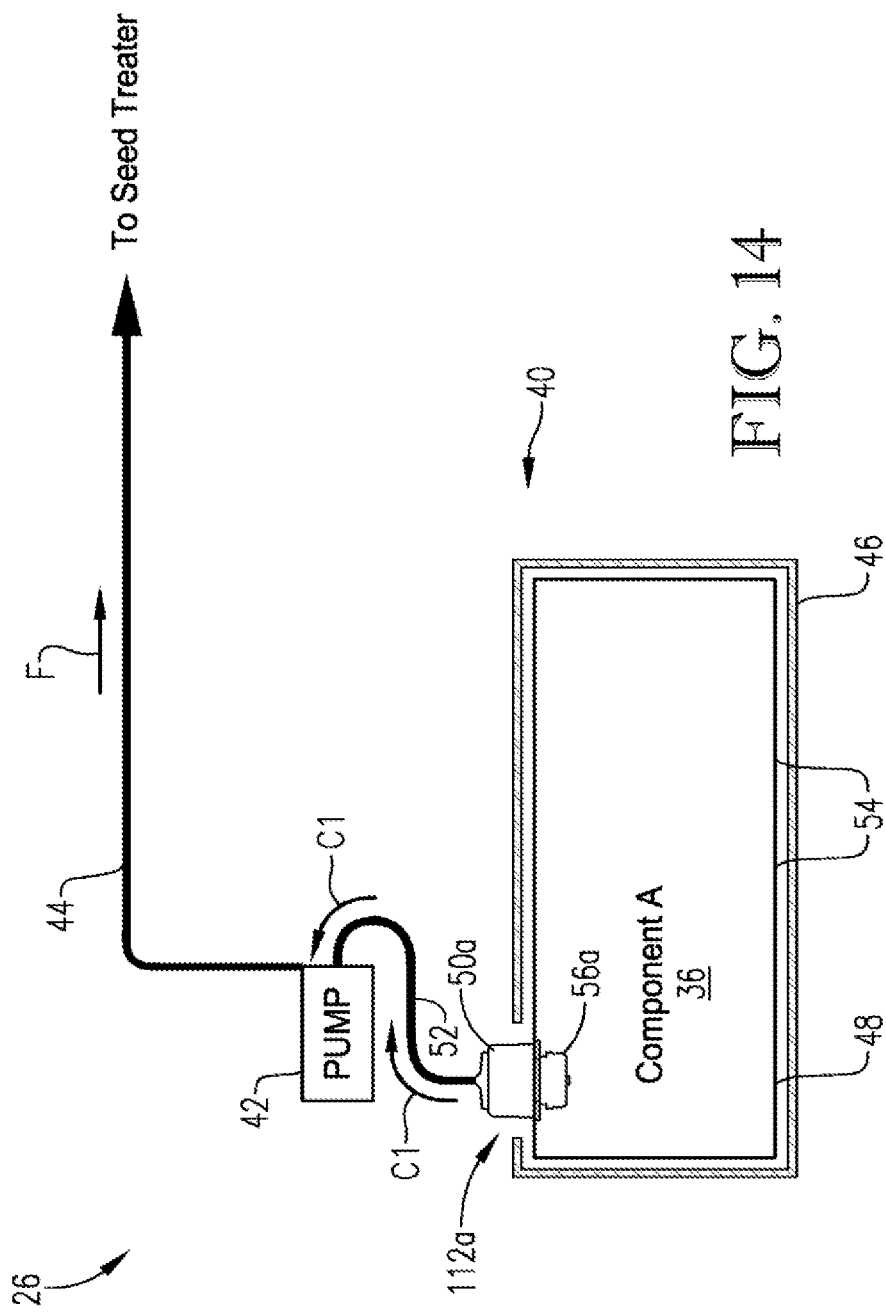
Figure 15:
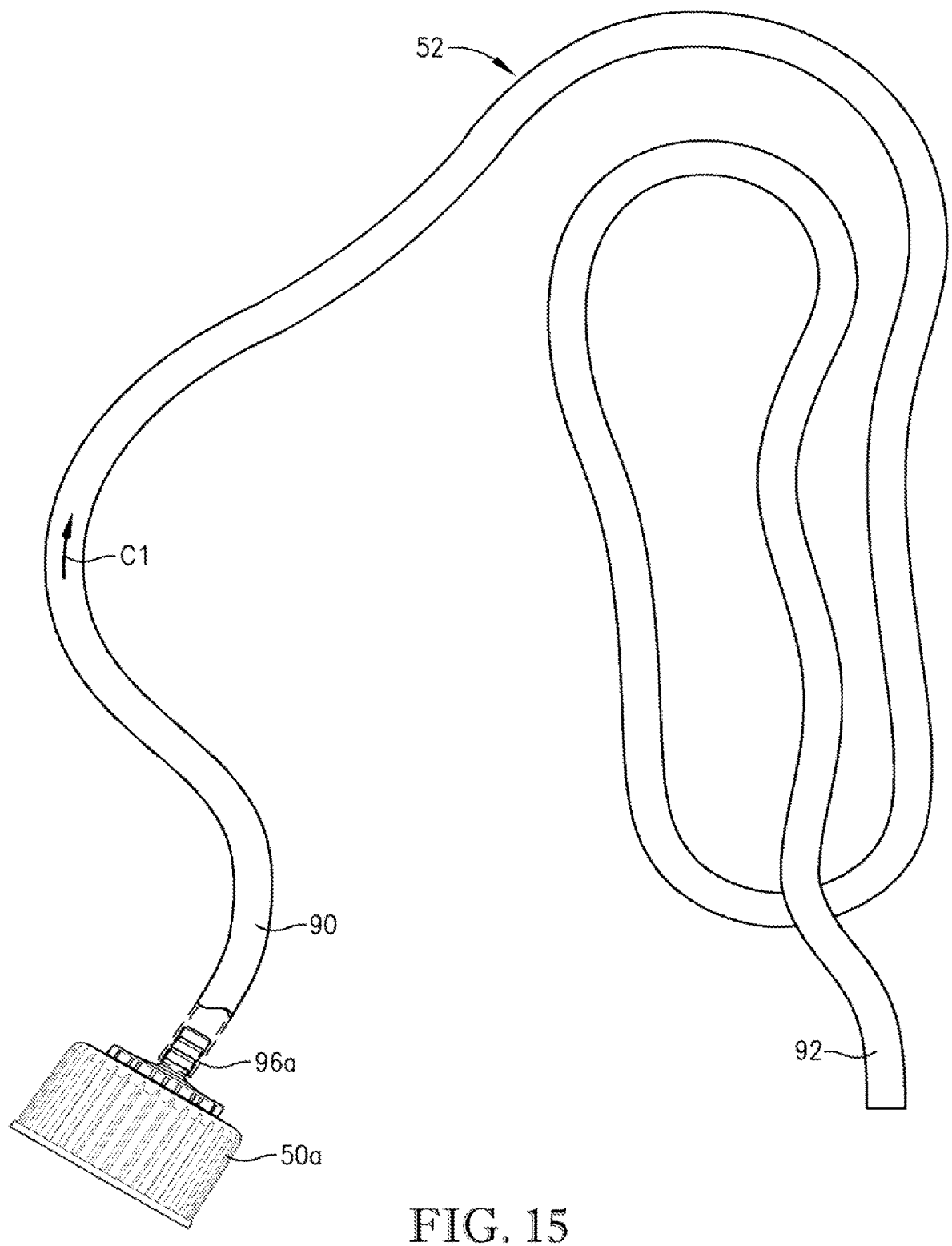

FIG. 14 is a fragmentary schematic view of an embodiment of a direct injection assembly showing a direct injection supply kit, pump, fluid supply line, and component rack of the direct injection assembly, with the supply kit including a component container, metering body, and a tubing set; and FIG. 15 is a fragmentary view of the direction injection supply kit shown in FIGS. 13 and 14, showing the tubing set and metering body;

The drawing figures do not limit the present invention to the specific embodiments disclosed and described herein. The drawings are not necessarily to scale, emphasis instead being placed upon clearly illustrating the principles of the preferred embodiment.

DETAILED DESCRIPTION OF THE PREFERRED EMBODIMENTS

Figure 1:
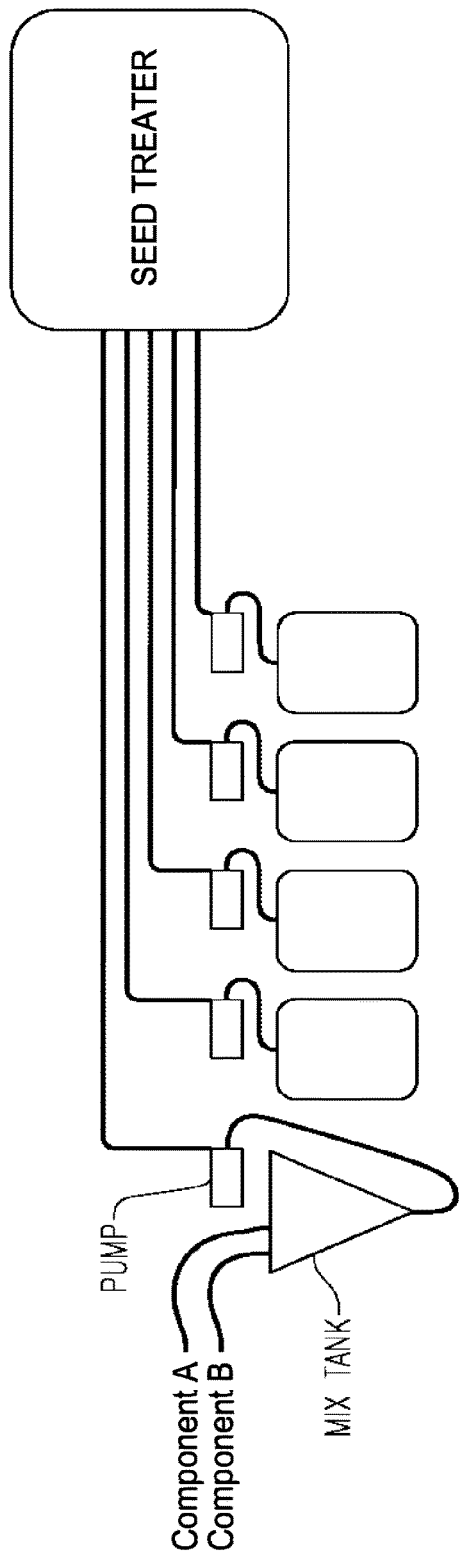
FIG. 1 is a schematic view of a prior art seed treatment system that includes a seed treater and a mix tank configured to have liquid treatment components manually poured therein.
Figure 2:
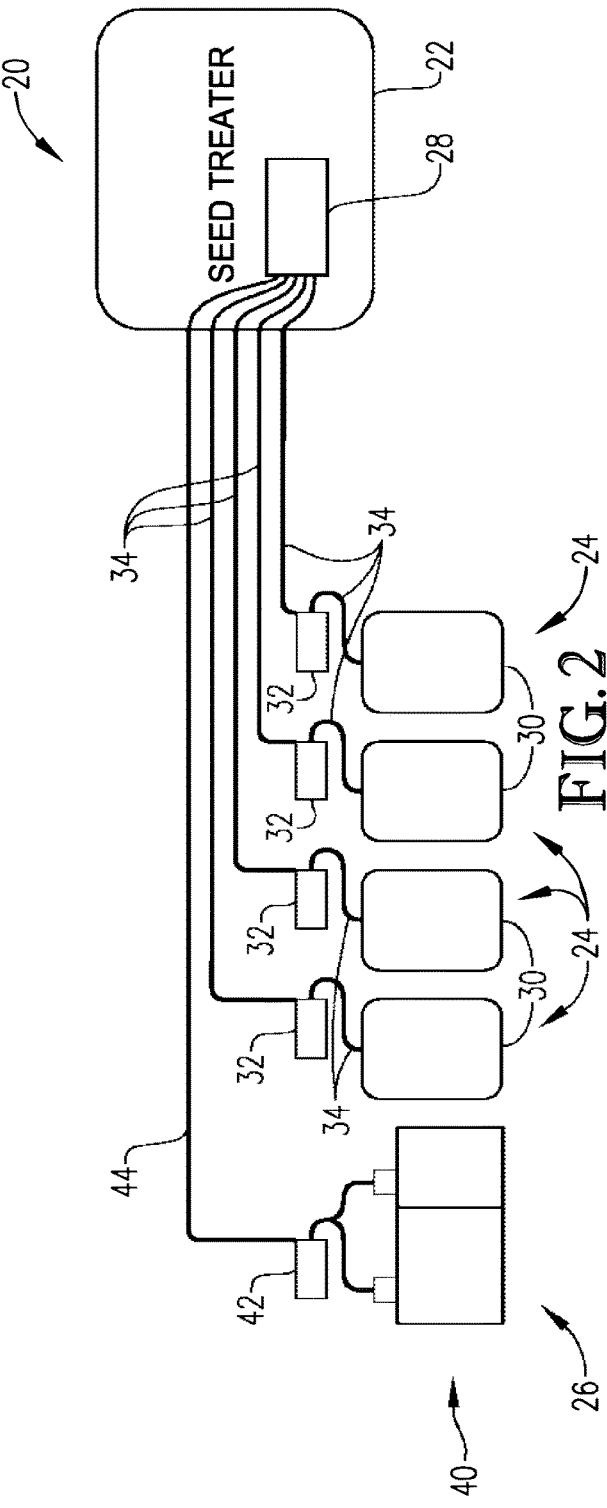
FIG. 2 is a fragmentary schematic view of a seed treatment system constructed in accordance with a preferred embodiment of the present invention, showing a direct injection assembly of the system.
Figure 3:
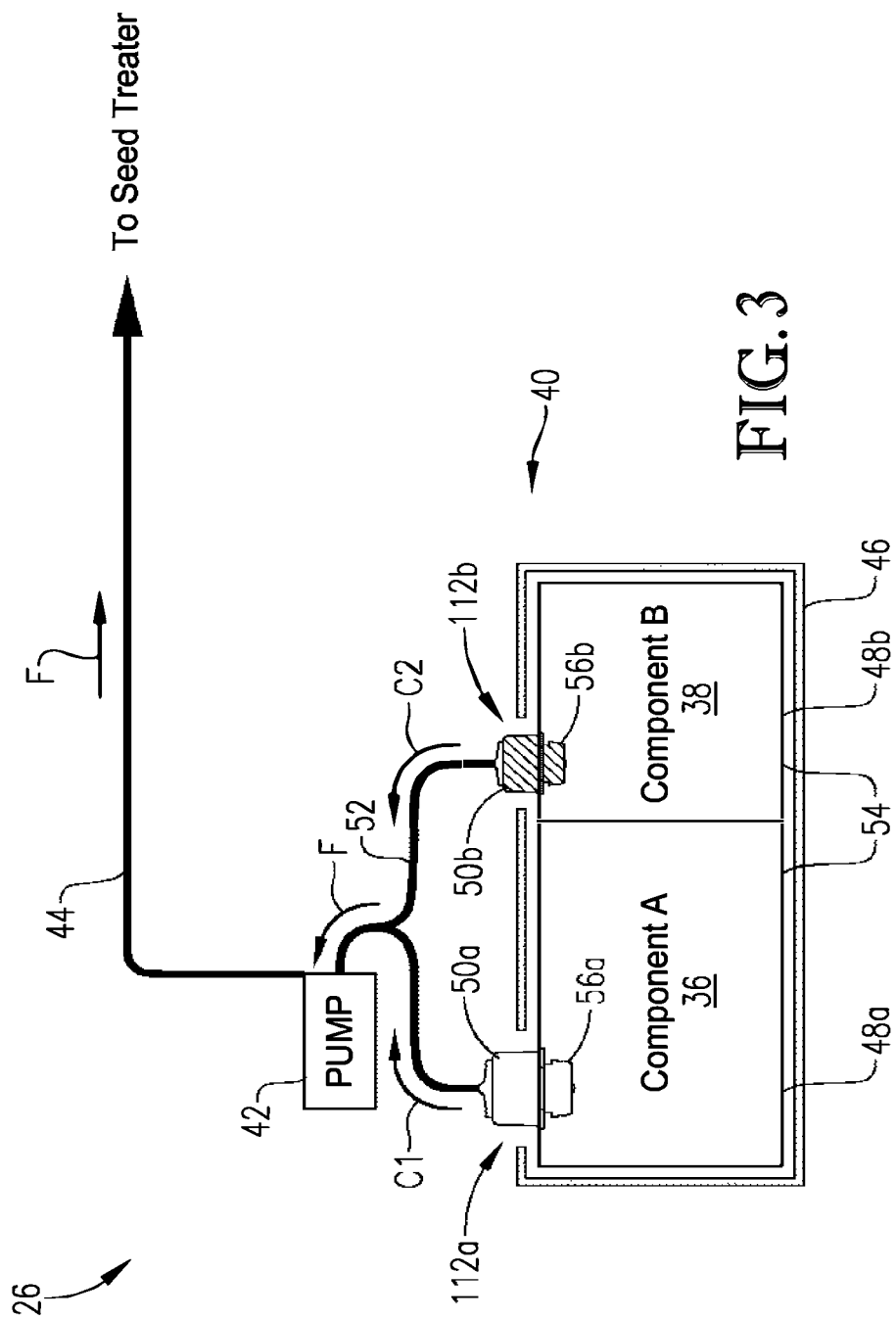
FIG. 3 is a fragmentary schematic view of the direct injection assembly shown in FIG. 2, showing a direct injection supply kit, pump, fluid supply line, and component rack of the direct injection assembly, with the supply kit including component containers, metering bodies, and a tubing set.

Turning initially to FIGS. 2 and 3, a seed treatment system 20 is configured to dispense a two-part liquid inoculant mixture and apply the mixture to a volume of seed (not shown). It will be understood that the seed treatment system 20 is operable to apply the mixture to various types of seed. Consistent with the principles of the present invention, the seed treatment system 20 is also operable to dispense and apply an alternative liquid mixture (such as an alternative multi-part mixture) to seed. Furthermore, for some aspects of the present invention, components of the system 20 could be used to dispense and/or apply a multi-part liquid mixture for applications other than seed treatment. The seed treatment system 20 broadly includes a powered seed treater 22, liquid chemical injection assemblies 24, and a direct injection assembly 26.

The seed treater 22 is configured to apply a flow of liquid chemical (e.g., a flow of liquid inoculant and/or one or more flows of other liquid chemicals) onto seed. The seed treater 22 includes, among other things, a controller (not shown) and a treatment vessel 28. In the usual manner, the vessel 28 presents a vessel chamber (not shown) to receive one or more flows of liquid chemicals. The vessel chamber also receives a supply of seed for treatment with one or more liquid chemical flows.

Each chemical injection assembly 24 includes a liquid chemical supply 30, a pump 32, and flow lines 34 to supply liquid chemical from the supply 30 to the vessel 28. The chemical supply 30 comprises a container with liquid chemical stored therein. The supply 30 is fluidly connected to the vessel chamber via the lines 34 and pump 32. The controller is operably connected to the pump 32 to selectively drive the pump 32 and thereby control the flow of liquid chemical from the container to the vessel 28.

The direct injection assembly 26 is operable to mix and supply a multi-part flow F of liquid components A (36) and B (38) to the vessel 28 (see FIG. 3). As will be discussed, the mixing of liquid components A (36) and B (38) is preferably done in an enclosed space to restrict contamination of the components 36,38 and to restrict operator exposure to the components 36,38. It will be understood that liquid components A (36) and B (38) can each independently be a single liquid mixture or can contain a pre-made multi-part liquid mixture.

It will also be appreciated that an alternative multi-part liquid mixture could be supplied by the direct injection assembly 26. For instance, one or both of the two (2) liquid components could comprise an alternative treatment liquid. Also, an alternative liquid mixture could include more than two (2) liquid components. For example, in some embodiments, the two or more liquid components can be 3, 4, 5, etc. In some embodiments, the direct injection assembly 26 contains more than 3 liquid components. In some embodiments, the direct injection assembly 26 contains more than 4 liquid components. The direct injection assembly 26 preferably includes a direct injection supply kit 40, a pump 42, fluid supply line 44, and a component rack 46.

It will further be appreciated that seed treatment system 20 can also be configured to dispense a single liquid inoculant mixture and apply the mixture to a volume of seed (not shown) (see FIG. 14). It will be understood that the seed treatment system 20 is operable to apply the mixture to various types of seed and is consistent with the same principles as the seed treatment system described in FIG. 2. The single liquid can be a single- and/or multi-part liquid mixture and could be supplied by a direct injection assembly 26 as is shown in FIG. 14, which shows a single liquid component A (36) that can contain a single liquid mixture or can contain a pre-made multi-part liquid mixture. The direct injection assembly 26 is operable to supply flow F of liquid component A (36) to the vessel 28 (see FIG. 14).

Turning to FIGS. 2-9 and 12, the illustrated supply kit 40 is operable to supply and combine the components 36, 38 of a multi-part inoculant mixture. The supply kit preferably includes a pair of liquid component containers 48a,b, a pair of metering bodies 50a,b associated with the containers 48a,b to dispense liquid component flows C1,C2 from the containers 48*a,b*, and a flow-combining tubing set 52 to combine the liquid component flows C1,C2 (see FIGS. 3 and 12).

Figure 12:
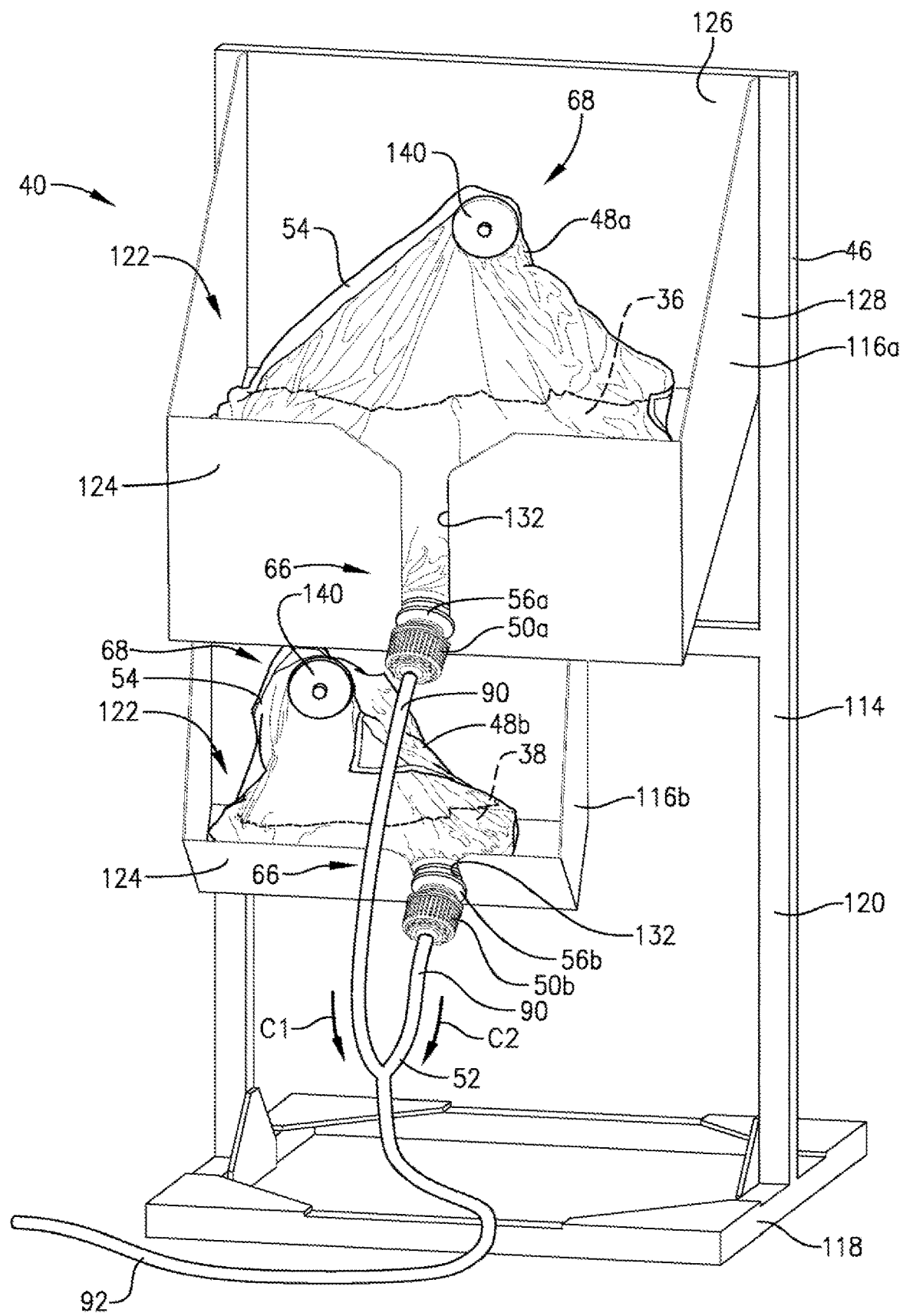
FIG. 12 is a perspective of the component rack shown in FIGS. 10 and 11, with the component containers being inserted in the corresponding trays and fluidly connected to metering bodies and the tubing set.

Each container 48 preferably presents an interior space configured to receive a corresponding liquid component 36,38 (see FIG. 12). Each container 48 preferably contains a premeasured volume of the corresponding liquid component. The relative component volumes are determined so as to provide a multi-part liquid mixture with a predetermined ratio of liquid components. As will be discussed, this ratio of liquid components can be produced by providing a corresponding ratio of component flow rates from the containers 48.

The containers 48 preferably provide liquid amounts corresponding to the proportions at which the liquid components are mixed, such that the containers will become empty at the same time (assuming they are opened and coupled to the system 20 contemporaneously). However, one of the benefits of the present invention is that such coordinated restocking of containers is not required.

In the illustrated embodiment, the liquid components 36,38 carried by the corresponding containers 48*a,b* preferably comprise a liquid rhizobial inoculant and a liquid growth enhancer, respectively, for subsequent mixing and application. However, it will be understood that the supply kit 40 could include additional or alternative liquid components to be combined and applied without departing from the scope of the present invention.

Turning to FIG. 14 the illustrated supply kit 40 is operable to supply component A (36), which can be a single-part inoculant mixture or a pre-made multi-part inoculant mixture. The supply kit also includes a metering body 50*a* associated with the container 48 to dispense liquid a component flow C1 from the container 48 via a flow-combining tubing 52. Container 48 preferably presents an interior space configured to receive a corresponding liquid component A (36), which contains a premeasured volume of the corresponding liquid component. The relative liquid component volume is determined so as to provide sufficient amounts to reach the seed treater without having large amounts of the liquid component left remaining after the seed coating has been completed.

In the illustrated embodiment, the liquid component A (36) carried by the corresponding container 48 preferably comprise a pre-made mixture of a liquid rhizobial inoculant and a liquid growth enhancer. In another illustrated embodiment, the liquid component A (36) carried by the corresponding container 48 preferably comprises either a liquid rhizobial inoculant or a liquid growth enhancer.

Figure 5:
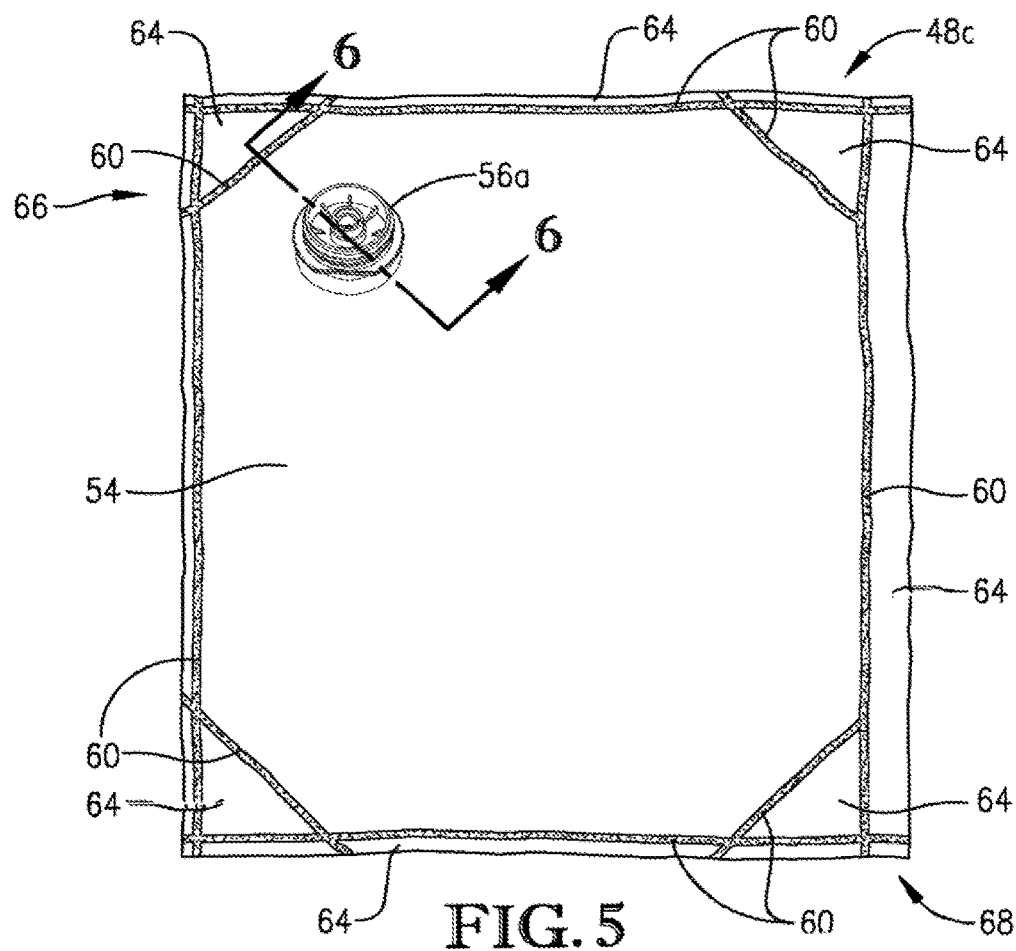
FIG. 5 is an elevation of one of the component containers shown in FIG. 3, showing a flexible bladder and a discharge nozzle, with the container being filled with a liquid component.
Figure 6:
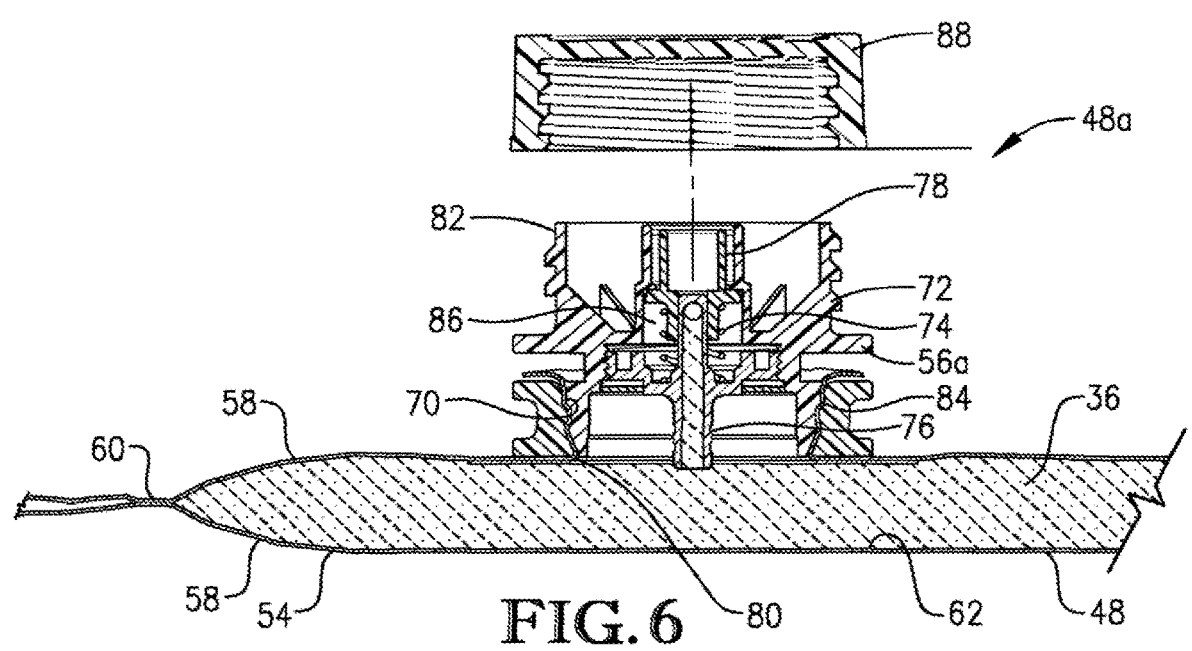
FIG. 6 is a cross section of the component container taken along line 6-6 in FIG. 5.

Turning to FIGS. 3, 5, 6, and 14 each container 48 and/or 48*a,b* preferably includes a flexible bladder 54 and a corresponding discharge nozzle 56*a* or 56*a,b* attached to the bladder 54. Container 48*a* is depicted in FIGS. 5 and 6 and is described below. Although the containers 48*a,b* are differently sized, it will be understood that the structure of container 48*b* otherwise corresponds to the structure of container 48*a*. It will be further understood that more than two liquid containers can be present, such as more than 3, 4, 5, etc, container in the injection system 26. In some embodiments, more than three containers are present in the injection system 26. In some embodiments, more than four containers are present in the injection system 26. In addition, it will be further understood that the single container 48 (in FIG. 14) is structurally and functionally equivalent to container 48*a*, particularly as to FIGS. 5 and 6.

The illustrated bladders 54 each have a conventional construction and include a pair of bladder webs 58 joined to one another along heat seal lines 60 (see FIGS. 5 and 6). The webs 58 cooperatively form an interior space 62 of the container 48 to receive the corresponding liquid component 36,38. The webs 58 also present peripheral margins 64 that extend along the heat seal lines 60.

Each web 58 preferably includes inner and outer plies (not shown) formed of a synthetic resin material. Preferably, for at least the inoculant bladder 54, the webs 58 are configured to permit oxygen from outside the bladder 54 to migrate into the interior space 62. In one preferred embodiment, each bladder 54 comprises a translucent APN Web Bag, Product No. 206027, supplied by Scholle IPN Corporation, Northlake, Ill. However, one or both of the bladders 54 could be alternatively configured without departing from the ambit of the present invention.

The illustrated bladder 54 presents opposite first and second bladder ends 66,68. The bladder 54 also presents a bladder opening 70 that fluidly communicates with the interior space 62 (see FIG. 6). In the illustrated embodiment, the bladder opening 70 is positioned adjacent the first bladder end 66 (i.e., closer to the first bladder end 66 than the second bladder end 68), which enables the liquid component within the interior space 62 to be conveniently evacuated from Turning to FIGS. 6-8, the interior space 62 is in fluid communication with the discharge nozzle 56, and fluid can be moved into and out of the interior space 62 of the container 48 by moving the fluid through the discharge nozzle 56. The illustrated nozzle 56 is normally-closed to prevent fluid flow therethrough and can be selectively opened to dispense liquid component from the container 48.

The discharge nozzle 56 preferably includes a nozzle body 72, spring 74, valve body 76, and nozzle valve 78. The illustrated nozzle body 72 has a unitary construction and presents a sealable upstream end 80 and a threaded downstream end 82.

Preferably, the nozzle 56 comprises a nozzle insert where the nozzle body 72 is sealingly engaged with the bladder 54 by securing the sealable upstream end 80 within the bladder opening 70. In the illustrated arrangement, a bladder margin 84 forms the bladder opening 70 and is secured in sealing engagement with the sealable upstream end 80 (see FIG. 6).

It is within the scope of the present invention where the construction of the nozzle body 72 and/or its attachment to the bladder 54 is alternatively provided. For instance, a tubular structure could be used to connect the nozzle body 72 to the bladder 54.

The valve body 76 and the nozzle body 72 are removably secured to each other and cooperatively define a chamber 86 to receive the spring 74 and the nozzle valve 78 (see FIG. 6). The spring 74 engages the nozzle valve 78 and urges the nozzle valve 78 into a closed position (see FIG. 6), while also permitting the nozzle valve 78 to shift into and out of an open position (see FIG. 7).

The nozzle valve 78 cooperates with the valve body 76 to prevent the flow of liquid component through the discharge nozzle 56, when the valve 78 is in the closed position. The nozzle valve 78 prevents liquid flow in both an upstream direction (i.e., toward the interior space 62 of the bladder 54) and a downstream direction (i.e., away from the interior space 62 of the bladder 54), when closed.

On the other hand, the nozzle valve 78 and valve body 76 permit the liquid component to flow through the discharge nozzle 56, when the valve 78 is in the open position. The open nozzle valve 78 permits liquid flow in the upstream and downstream directions, although, as will be described, liquid flow in the upstream direction (that is, liquid flow toward the interior space 62) is preferably prevented by the supply kit 40.

As will also be explained, the nozzle valve 78 is preferably operable to be shifted between the open position and the closed position by corresponding engagement and disengagement with the respective metering body 50. The principles of the present invention are equally applicable where the nozzle 56 includes an alternative valve configuration.

The illustrated nozzle 56 preferably comprises a nozzle insert assembly provided by RD Industries of Omaha, Nebr. Additional details concerning preferred features of the nozzle are disclosed by U.S. Pat. No. 6,142,345, issued Nov. 7, 2000, entitled CLOSED LOOP DISPENSING SYSTEM, and U.S. Pat. No. 6,968,983, issued Nov. 29, 2005, entitled CLOSED LOOP DISPENSING SYSTEM, each of which is hereby incorporated in its entirety by reference herein. However, the principles of the present invention are applicable where the nozzle is alternatively configured (e.g., as discussed above).

Each container 48*a,b* (or 48) is preferably sterilized prior to receiving the corresponding liquid component 36,38 (or 36). After the container 48 is partly or entirely filled with liquid component, the threaded end of the nozzle 56 can be covered with a threaded cap 88. The cap 88 is selectively removable from the nozzle 56 (e.g., to permit attachment of the nozzle 56 to the metering body 50).

Figure 4:
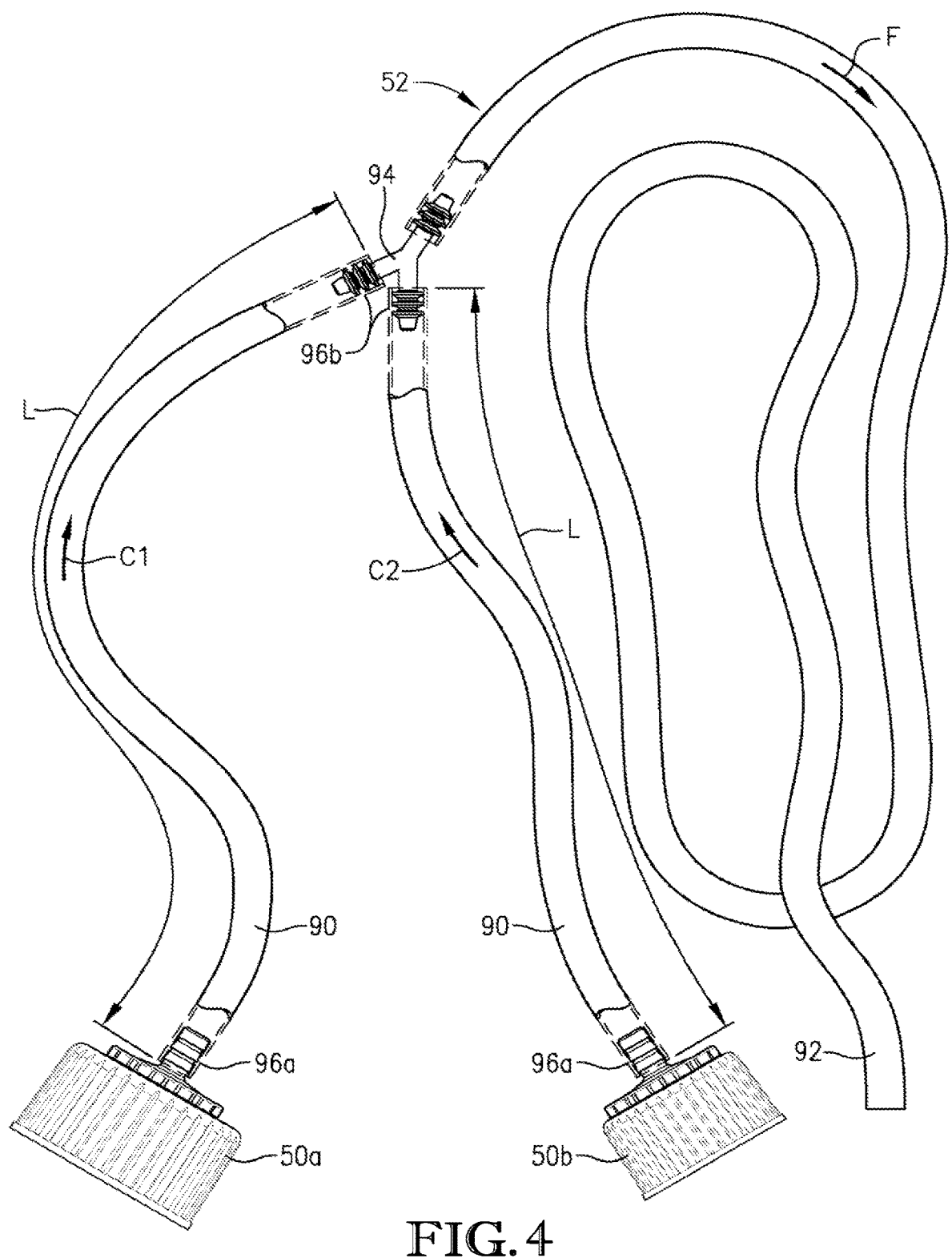
FIG. 4 is a fragmentary view of the direction injection supply kit shown in FIGS. 2 and 3, showing the tubing set and metering bodies.

Turning to FIGS. 3 and 4, the illustrated tubing set 52 includes upstream tubing lines 90, downstream tubing line 92, and a wye tubing connector 94. The upstream tubing lines 90 each have an upstream end 96*a* and a downstream end 96*b*. The upstream end 96*a* is attached to and fluidly communicates with a corresponding metering body 50, while the downstream end 96*b* is attached to and fluidly communicates with the wye tubing connector 94.

The tubing set 52 is configured to receive liquid component flows C1, C2 from the containers 48*a,b*. Furthermore, the tubing set 52 preferably combines the liquid component flows C1,C2 into the multi-part flow F and permits intermixing of the liquid component flows C1,C2. The resulting single mixture flow F is discharged by the downstream tubing line 92 toward the vessel 28 of the seed treater 22. In the illustrated embodiment, the pump 42 draws the single mixture flow F from the tubing set 52 and pumps the single mixture flow F through the fluid supply line 44 and into the vessel 28 of the seed treater 22.

The illustrated upstream tubing lines 90 each present a length dimension L measured from the upstream end 96*a* to the downstream end 96*b* (see FIG. 4). Preferably, to provide accurate proportioning of the liquid components 36,38, the length dimensions L of the upstream tubing lines 90 are substantially the same.

It will be appreciated that an alternative tubing set could be used to receive and combine liquid component flows C1,C2. For instance, to deliver a combination of more than two liquid components to the seed treater 22, an alternative tubing set could include a corresponding number (i.e., more than two) upstream tubing lines. In these instances, it would be understood that tubing connector 94 would be adjusted accordingly based on the number of additional up upstream tubing lines.

Turning to FIGS. 14 and 15, the illustrated tubing set 52 includes upstream tubing line 90 and a downstream tubing line 92. The upstream tubing line 90 has an upstream end 96*a* which is attached to and fluidly communicates with a corresponding metering body 50*a*.

The tubing set 52 is configured to receive a liquid component flow C1 from container 48. Furthermore, the tubing set 52 allows for the liquid component to travel as flow F downstream tubing line 92 toward the vessel 28 of the seed treater 22. In the illustrated embodiment, the pump 42 draws the liquid component as flow F from the tubing set 52 and pumps the liquid component flow F through the fluid supply line 44 and into the vessel 28 of the seed treater 22.

Figure 7:
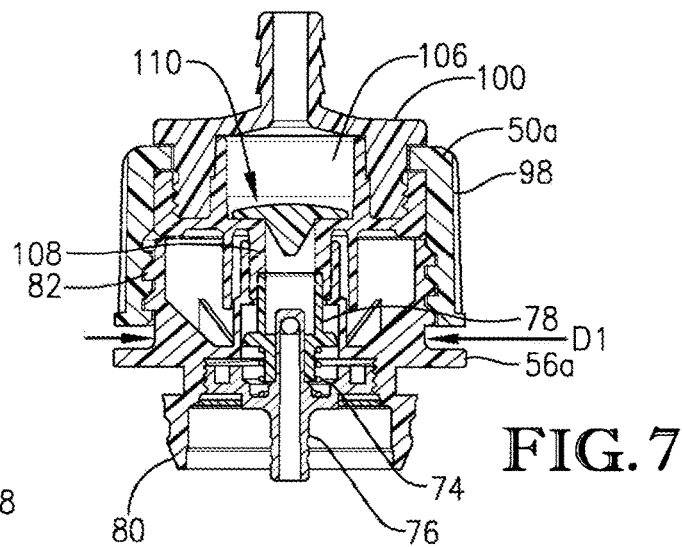
FIG. 7 is a cross section of one of the metering bodies shown in FIG. 4 and the discharge nozzle shown in FIGS. 5 and 6, showing the metering body and the nozzle mated with one another with a valve of the discharge nozzle shifted by the metering body into an open position to permit fluid flow through the nozzle and the metering body.
Figure 8:
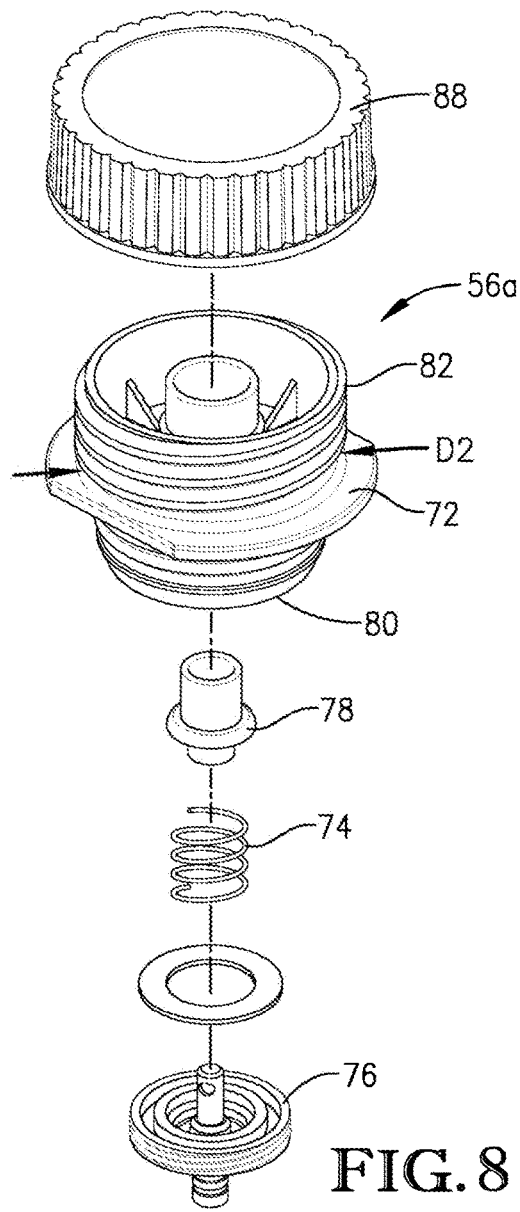
FIG. 8 is an exploded perspective of the discharge nozzle shown in FIGS. 5-7, showing a nozzle body, valve body, spring, and nozzle valve of the discharge nozzle, and showing a threaded cap removed from the nozzle body.
Figure 9:
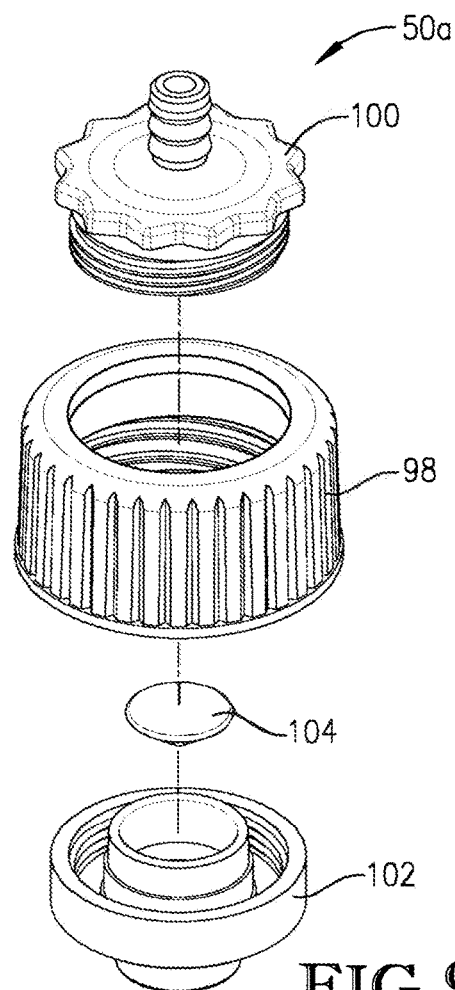
FIG. 9 is an exploded perspective of the metering body shown in FIGS. 4 and 7, showing a retaining ring, receiver, valve body, and one-way check valve of the metering body.

Turning to FIGS. 7 and 9, each metering body 50*a,b* is preferably configured to fluidly communicate with the respective component container 48*a,b* and control a flow rate of the corresponding liquid component flow C1,C2 from the respective bladder 54. Each metering body 50 preferably includes a threaded retaining ring 98, a receiver 100, a valve body 102, and a one-way check valve 104.

Metering body 50*a* is depicted in FIGS. 7 and 9 and is described below. Although the metering bodies 50*a*,50*b* are differently sized, it will be understood that the structure of metering body 50*b* otherwise corresponds to the structure of metering body 50*a*.

The valve body 102 and the receiver 100 are threadably attached to one another and cooperatively define a chamber 106 that receives the check valve 104 (see FIG. 7). The check valve 104 includes a shiftable peripheral margin that is shiftable between a closed position (see FIG. 7), where the peripheral margin engages the valve body, and an open position (not shown), where at least part of the peripheral margin is spaced from the valve body 102. It will be understood that the metering body 50*a,b* could have an alternative valve arrangement without departing from the scope of the present invention.

The check valve 104 and valve body 102 cooperatively prevent upstream fluid flow through the metering body 50 while permitting downstream fluid flow through the metering body 50. Thus, with the metering bodies 50*a,b* attached to the corresponding nozzles 56*a,b* and in fluid communication with the interior space 62 of the bladder 54, the metering bodies 50 are preferably configured to freely permit component flows C1,C2 out of the containers 48 while preventing any upstream flow (i.e., backflow) of liquid component into (or toward) the containers 48.

The metering body 50 is removably attached to the nozzle 56 and brought into fluid engagement therewith by threading the retaining ring 98 onto the threaded downstream end 82 of the nozzle 56. Although the illustrated metering body 50 is preferably threaded onto the nozzle 56, the nozzle 56 and metering body 50 could be alternatively removably secured to one another (e.g., to provide convenient and' or quick engagement and disengagement). For instance, the nozzle 56 and metering body 50 could be attached to one another using multiple threaded fasteners or using a quick-coupling device that is devoid of a threaded connection.

As the retaining ring 98 is threaded on the nozzle 56, the metering body 50 engages the nozzle valve 78 and shifts the nozzle valve 78 in the upstream direction from the closed position (see FIG. 6) to the open position (see FIG. 7). In particular, the illustrated valve body 76 includes a sleeve 108 that engages the nozzle valve 78 to shift the valve 78 open (see FIG. 7). Attachment of the metering body 50 to the nozzle 56 causes the nozzle valve 78 to be opened and thereby permits the flow of liquid component from the bladder 54 toward the seed treater 22.

The metering body 50 is also operable to be selectively detached from the corresponding discharge nozzle 56. The metering body 50 is detached by threading the retaining ring 98 out of engagement with the threaded downstream end 82 of the nozzle 56. As the metering body 50 is threaded out of engagement with the nozzle 56, the sleeve 108 moves out of engagement with the nozzle valve 78, which permits the valve 78 to return to the normally-closed valve position. In particular, the spring 74 urges the valve 78 to return to the closed position as the metering body 50 is disengaged from the nozzle 56.

The check valve 104 and valve body 102 cooperatively provide a metering orifice 110 (see FIG. 7) associated with each of the metering bodies 50*a,b*. In the illustrated embodiment, the metering orifices 110 are preferably dissimilar to provide distinct flow rates of the corresponding liquid components. That is, the metering orifices 110 are operable to meter liquid components from the containers to produce liquid component flows C1,C2 with different flow rates at a predetermined ratio. The system 20 is configured to produce a predetermined ratio of flow rates C1,C2 so that the system 20 provides a supplied multi-part liquid volume to the seed treater 22, and the supplied multi-part liquid volume has a corresponding predetermined ratio of liquid components. It would be understood that for a system 20 that is configured to contain more than two liquid components that metering orifices 110 are used to meter liquid components from multiple containers to produce multiple liquid components flows (e.g., C1, C2, C3 etc.) with different flow rates at a predetermined ratio.

For example, the flow C1 is associated with flow of liquid inoculant, and flow C2 is associated with flow of liquid growth enhancer. In the illustrated embodiment, the ratio of inoculant flow rate to growth enhancer flow rate preferably ranges from about 2:1 to about 10:1 and, more preferably, about 4:1 to about 8:1. However, it is within the ambit of the present invention where the metering orifices provide ratios of flow rates outside of these ranges.

Alternatively, the check valve 104 and valve body 102 cooperatively provide a metering orifice 110 (see FIG. 7) associated with a metering body 50*a* (as is shown in FIG. 14). In the illustrated embodiment, the metering orifice 110 is able to provide distinct flow rates of the corresponding liquid component based on its size (e.g., diameter). That is, the metering orifice 110 is operable to meter a liquid component from the container to produce a certain flow rate of flow C1. The system 20 is then configured to produce a certain flow rate C1 so that the system 20 provides a supplied liquid volume to the seed treater 22, and the supplied liquid volume can contain a single liquid component 36 or can contain a pre-made mixture as a liquid component 36.

The illustrated metering body 50 preferably comprises an adapter assembly provided by RD industries of Omaha, Nebr. Additional details concerning preferred features of the metering body, such as the check valve, are disclosed by the above-incorporated '345 patent and '983 patent. However, the principles of the present invention are applicable where the metering body is alternatively configured (e.g., as discussed above).

Because the metering bodies 50 have different metering orifices 110 (associated with corresponding component flow rates), the metering bodies 50 and nozzles 56 preferably have indicia to associate the metering bodies 50 (and orifices 110) with the corresponding containers 48. In the illustrated embodiment, the nozzle 56*a* and the metering body 50*a* to which the nozzle 56*a* is removably mated both present color indicia 112*a* (see FIG. 3). Similarly, the nozzle 56*b* and the metering body 50*b* to which the nozzle 56*b* is removably mated both present color indicia 112*b* (see FIG. 3). Preferably, the color indicia 112*a* and color indicia 112*b* are distinctly different. Therefore, the metering body 50*a* and nozzle 56*a* are visibly different than the metering body 50*b* and nozzle 56*b*. In this manner, the color indicia 112*a,b* facilitates attachment of each metering body 50*a,b* (and the respective metering orifice 110) to the corresponding nozzle 56*a,b*. In other words, the distinct indicia reduces the risk of a metering body being attached to the wrong container 48. For embodiments such as in FIG. 14 where only a single metering body 50*a* is present a color indicia 112*a* can also present.

It is also within the ambit of the present invention where the metering bodies 50 and nozzles 56 present alternative indicia to associate each metering body 50 with the corresponding container 48. For instance, the metering bodies 50 and nozzles 56 could include words, shapes, texturing, or combinations thereof.

Also in the illustrated embodiment, the metering bodies 50*a,b* define inner ring diameter dimensions D1 (see FIG. 7) that are different from each other. The nozzles 56*a,b* present nozzle diameter dimensions D2 (see FIG. 8) that are different from each other. As a result, the different nozzle and metering body sizes also facilitate attachment of each metering body 50*a,b* to the corresponding nozzle 56*a,b*.

Figure 10:
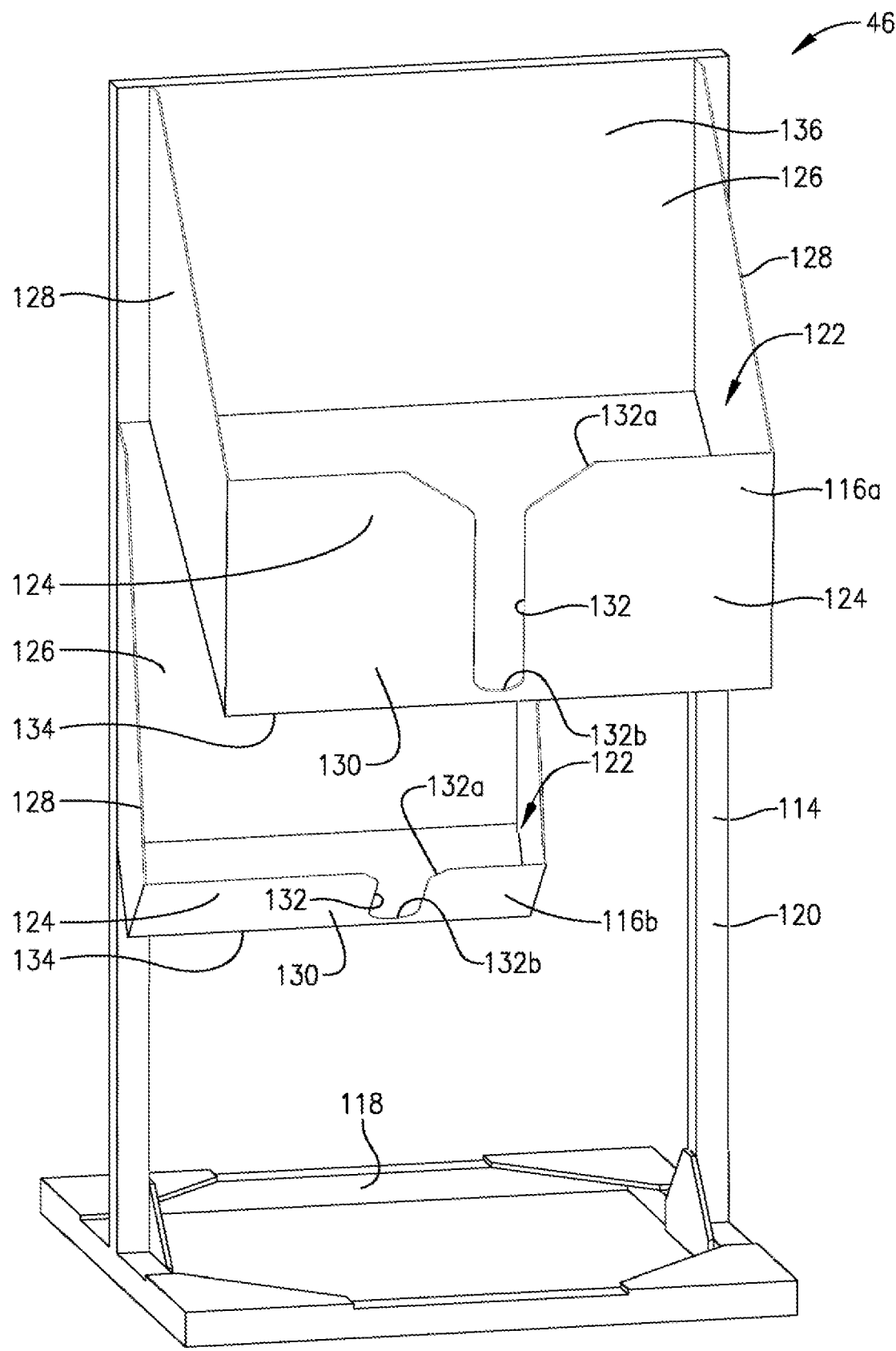
FIG. 10 is a perspective of the component rack shown schematically in FIG. 3, showing a framework and container trays mounted to the framework.
Figure 11:
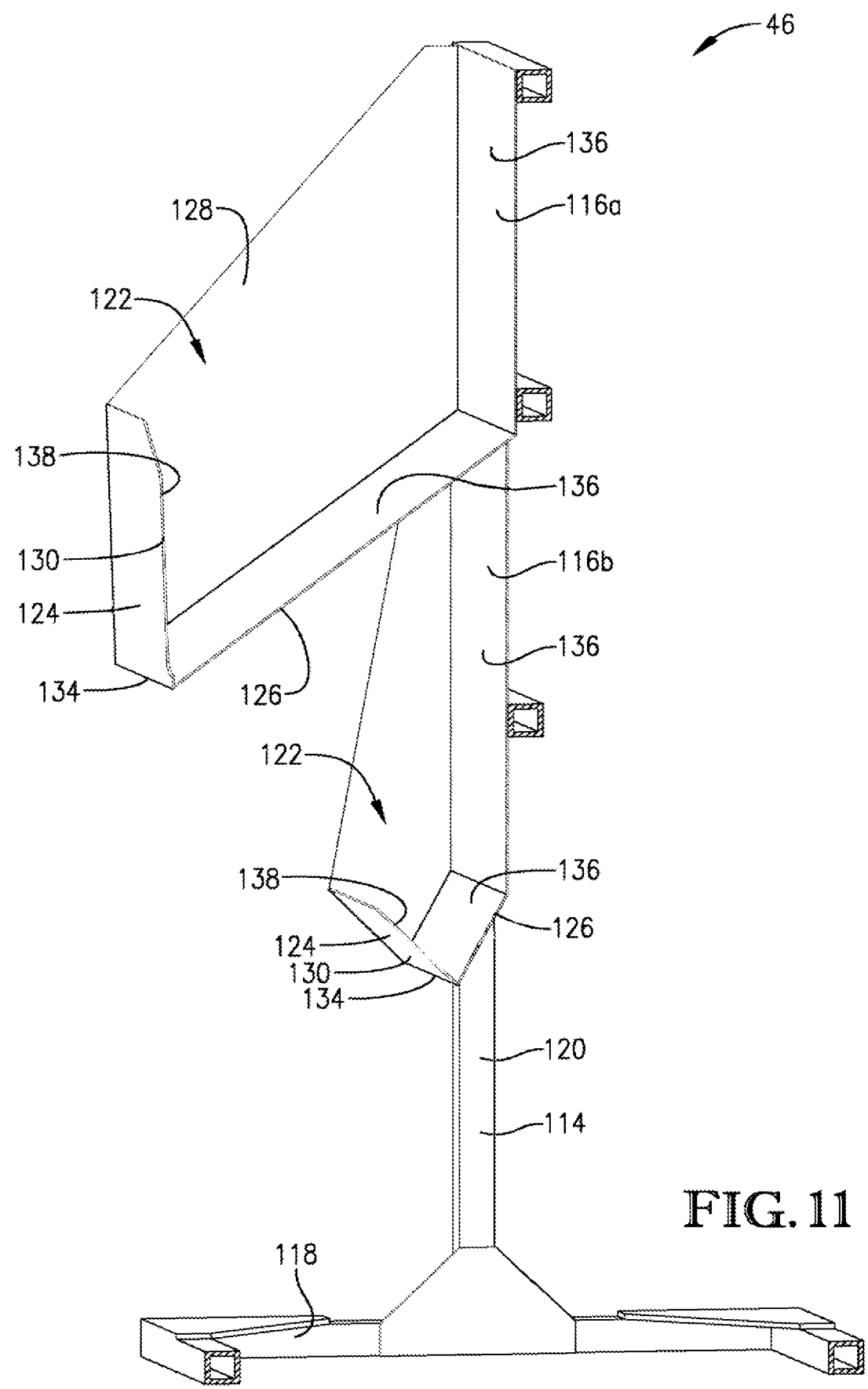
FIG. 11 is a fragmentary perspective of the component rack shown in FIG. 10, with the component rack being cross-sectioned to show the interiors of the container trays, showing a slotted plate and a backing plate with interior support surface that converge toward each other in a downward direction.

Turning to FIGS. 10-12, the liquid component containers 48*a,b* are operably supported and retained by the component rack 46. The illustrated rack 46 is a freestanding structure that is preferably movable relative to other components of the seed treatment system 20. As will be described, the component rack 46 is configured so that the containers 48 efficiently discharge the liquid components 36,38. Preferably, the component rack 46 includes an upright framework 114 and container trays 116*a,b* attached to the framework 114.

It will be understood that the number of container trays 116 present in the component rack 46 shown in FIGS. 10-12 can vary depending on the number of liquid containers 48 require support. For example, for a component rack 46 supporting a single liquid component container 48 only a single container tray 116 is attached to the framework 114. In another example, for the component rack 46 supporting multiple liquid component containers, i.e., 48*a*, 48*b*, 48*c* etc., multiple container trays 116 are attached to the framework 114.

The illustrated framework 114 comprises a rigid steel tubing structure with a base 118 and an upright frame 120 fixed to the base 118. The trays 116 are preferably fixed to the upright frame 120 with fasteners (not shown) so that both trays 116 are securely supported by the framework 114 at locations spaced above the ground.

It will be appreciated that the framework 114 could be alternatively configured to support the trays 116 without departing from the scope of the present invention. While the illustrated framework 114 comprises a steel construction, one or more components of the framework could formed of one or more alternative materials, such as aluminum or synthetic resin material.

Although the illustrated framework 114 is movable independently of other system components, the framework 114 could be integrated into the chassis of the seed treater 22 (or other system components). Also, for some aspects of the present invention, the trays 116 could be mounted directly onto the seed treater 22 another component of the system 20.

Yet further, the trays 116 could be alternatively positioned relative to one another. For example, rather than having the tray 116*a* located above the tray 116*b*, the trays 116*a,b* could be positioned in a side-by-side arrangement.

Each tray 116 comprises a generally rigid receptacle that presents a tray interior 122 to receive a corresponding one of the containers 48. The trays 116 each include a slotted plate 124, a backing plate 126, and opposite side plates 128.

The slotted plate 124 preferably provides a nozzle connector 130 that slidably engages a corresponding nozzle 56. The slotted plate 124 presents an upright slot 132 that defines an open upper slot end 132*a* and a closed lower slot end 132*b* (see FIG. 10). The lower slot end 132*b* is positioned adjacent a lower margin 134 of the slotted plate 124. The nozzle connector 130 is configured to selectively secure the nozzle 56 at the lower slot end 132*b* by sliding the nozzle 56 through the upper slot end 132*a*.

It will also be understood that an alternative connector structure could be used to removably mount the nozzles 56 without departing from the scope of the present invention. Suitable nozzle connectors may present a slightly oversized enclosed opening through which the nozzle projects. Also, alternative nozzle connectors may take the form of a basket-shaped structure formed of a corrugated material, wire, etc.

The backing plate 126 presents an upright interior support surface 136 that opposes an interior support surface 138 presented by the slotted plate 124 (see FIG. 11). In part, the support surfaces 136,138 form the tray interior 122.

In the illustrated embodiment, the support surfaces 136, 138 converge toward each other in a downward direction and cooperatively engage and support the bladder 54 in an upright orientation. The support surfaces 136,138 also cooperatively restrict removal of the container 48 from the tray 116. That is to say, removal of the container 48 is generally limited to lifting the container 48 upwardly through the open top of the tray 116.

By converging in the downward direction, the support surfaces 136,138 also serve to funnel liquid component within the bladder 54 toward the discharge nozzle 56. The interior support surface 136 of the backing plate 126 preferably projects above the nozzle connector 130 to engage and support the bladder 54 in an upright orientation where the bladder end 68 is positioned above the bladder end 66. Consequently, the support surfaces 136,138 are shaped and configure to promote efficient and complete emptying of the containers 48)

The tray 116 also preferably includes a magnetic disc 140 that is magnetically attached to the metal backing plate 126 to hold the bladder end 68 above the bladder end 66 (see FIG. 12). However, it is within the scope of the present invention where an alternative fastener (e.g., a threaded fastener or a clamp) is used to removably attach the bladder 54 to the backing plate 126.

It will be appreciated that an alternative tray structure could be used to support the containers 48. For instance, it is within the ambit of the present invention where the component rack 46 includes a single tray (e.g., for side-by-side container positioning) that presents a single continuous tray interior.

The trays 116 are preferably formed of sheet metal panels, but could be variously constructed. For instance, alternative trays could be molded from a synthetic resin material.

Each container 48 is mounted in the corresponding tray 116 by sliding the nozzle 56 through the upper slot end 132*a* and into the lower slot end 132*b*. The corresponding bladder 54 is also positioned in the tray interior 122 in engagement with the support surfaces 136,138. The bladder end 68 is removably secured to the backing plate 126 with the magnetic disc 140.

In use, the system 20 is configured to dispense multiple liquid components and combine the components to provide a multi-part liquid mixture having a predetermined ratio of liquid components. With the containers 48 mounted on the component racks 46, the nozzles 56 are fluidly attached to the corresponding metering bodies 50 and the tubing set 52. Attachment of the metering bodies 50 and nozzles 56 preferably opens the nozzle valves 78 to permit liquid component flow out of the containers 48. The metering bodies 50*a,b* and nozzles 56*a,b* preferably have indicia to facilitate the attachment of metering bodies 50*a,b* (and the respective metering orifice 110) to the corresponding nozzle 56*a,b* and container 48*a,b*.

Systems configured to dispense a single liquid component operate in a similar manner, where the container 48 is mounted on the component rack 46, the nozzle 56 is fluidly attached to the metering body 50 (as shown in FIG. 14) and the tubing set 52 (as shown in FIG. 15). Attachment of the metering body 50 and nozzle 56 preferably opens the nozzle valve 78 to permit liquid component flow out of the container 48.

The pump 42 can be selectively engaged to draw component flows C1,C2 from the containers 48. The metering bodies 50 are preferably configured to permit component flows C1,C2 out of the containers 48 while preventing any upstream flow (i.e., backflow) of liquid component into (or toward) the containers 48. At the same time, the metering bodies 50*a,b* preferably provide a predetermined ratio of component flow rates from the containers 48. The support surfaces 136,138 facilitate efficient and complete emptying of the containers 48. Pumps of systems configured to dispense a single liquid component essentially operate in the same manner Although the above description presents features of preferred embodiments of the present invention, other preferred embodiments may also be created in keeping with the principles of the invention. Such other preferred embodiments may, for instance, be provided with features drawn from one or more of the embodiments described above. Yet further, such other preferred embodiments may include features from multiple embodiments described above, particularly where such features are compatible for use together despite having been presented independently as part of separate embodiments in the above description.

The preferred forms of the invention described above are to be used as illustration only, and should not be utilized in a limiting sense in interpreting the scope of the present invention. Obvious modifications to the exemplary embodiments, as hereinabove set forth, could be readily made by those skilled in the art without departing from the spirit of the present invention.

The inventors hereby state their intent to rely on the Doctrine of Equivalents to determine and assess the reasonably fair scope of the present invention as pertains to any apparatus not materially departing from but outside the literal scope of the invention as set forth in the following claims.

What is claimed is:

1. A direct injection supply kit to mix liquid components into a mixture and deliver the mixture to a treatment device, said direct injection supply kit comprising:
   one or more liquid component containers each comprising an interior space configured to receive a corresponding one of the liquid components of the mixture, each of said one or more containers including an elongated flexible bladder, which generally defines the interior space, and a discharge nozzle, which fluidly communicates with the interior space to discharge a flow of the corresponding liquid component from the bladder;
   said discharge nozzle including a housing and a nozzle valve shiftably mounted in the housing;

said nozzle valve being shiftable into and out of a normally closed valve position where the housing nozzle valve cooperatively prevents fluid flow through the nozzle;

one or more metering bodies fluidly communicating with the respective one or more component containers, each of said one or more metering bodies defining a metering orifice to control a flow rate of the corresponding liquid component from the bladder, wherein the metering bodies present dissimilar metering orifices so as to provide distinct flow rates of the corresponding liquid components; and each of said one or more metering bodies being removably attached to the corresponding discharge nozzle, with attachment of the metering body to the corresponding discharge nozzle causing the respective nozzle valve to shift out of the closed position and thereby permit the flow of the corresponding liquid component from the bladder to the treatment device.

2. The direct injection supply kit as claimed in claim 1, comprising one liquid component container.

3. The direct injection supply kit of claim 2, further comprising: an enclosed mixing structure that fluidly communicates with the metering body to receive the flow of the liquid component as the flow advances to the treatment device, wherein the mixing structure includes a single tubing line with an upstream end thereof fluidly communicating with the metering body, and a downstream end fluidly communicating with a tubing connector that is included in the enclosed mixing structure.

4. The direct injection supply kit as claimed in claim 3, further comprising: a one-way valve associated with one of the bladders, said one-way valve permitting fluid flow out of the one bladder and preventing fluid flow into the bladder when the one-way valve is in fluid communication with the one bladder.

5. The direct injection supply kit as claimed in claim 1, comprising two or more liquid component containers.

6. The direct injection supply kit as claimed in claim 5, further comprising: an enclosed mixing structure that fluidly communicates with the metering bodies to receive and permit intermixing of the flows of liquid components to form the mixture as the flows are advanced to the treatment device.

7. The direct injection supply kit as claimed in claim 6, said enclosed mixing structure including a plurality of tubing lines with upstream ends thereof fluidly communicating with respective metering bodies, said enclosed mixing structure including a tubing connector to mix the flows of liquid components and to discharge a single mixture flow to the treatment device, with the lines comprising downstream ends in fluid communication with the tubing connector.

8. The direct injection supply kit as claimed in claim 7, said lines each comprising a length dimension measured from the upstream end to the downstream end of the respective line, with the length dimensions of the lines being substantially the same.

9. The direct injection supply kit as claimed in claim 7, further comprising: a one-way valve associated with one of the bladders, said one-way valve permitting fluid flow out of the one bladder and preventing fluid flow into the bladder when the one-way valve is in fluid communication with the one bladder.

10. The direct injection supply kit as claimed in claim 1, further comprising: one or more one-way valves associated with one or more of the bladders, said one or more one-way valve permitting fluid flow out of the one or more bladders and preventing fluid flow into the one or more bladders when the one-way valve is in fluid communication with the one or more bladders.

11. The direct injection supply kit as claimed in claim 1, wherein the detachment of the one or more metering bodies from the corresponding one or more discharge nozzles permits each nozzle valve to return to the normally-closed valve position.

12. The direct injection supply kit as claimed in claim 11, said one or more metering bodies having corresponding metering body indicia that are different from one another, said one or more discharge nozzles having respective nozzle indicia associated with each metering body indicia of the corresponding one or more metering bodies, so as to facilitate attachment of each discharge nozzle with the respective metering body.

13. The direct injection supply kit as claimed in claim 1, at least one of said bladders comprising a gas-permeable bag that permits oxygen from outside the bladder to migrate into the interior space.

* * * * *